(12) United States Patent
Barnes et al.

(10) Patent No.: US 7,945,573 B1
(45) Date of Patent: May 17, 2011

(54) DYNAMIC TRANSCODING TO STITCH STREAMING DIGITAL CONTENT

(75) Inventors: James D. Barnes, Overland Park, KS (US); Steve Danzo, Kansas City, MO (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 390 days.

(21) Appl. No.: 12/028,927

(22) Filed: Feb. 11, 2008

(51) Int. Cl.
G06F 7/00 (2006.01)
G06F 17/30 (2006.01)
G06F 16/00 (2006.01)

(52) U.S. Cl. .......... 707/756; 707/705; 707/736

(58) Field of Classification Search .......... 705/1, 14.54; 455/414.1, 414.3; 707/999.101, 999.202
See application file for complete search history.

(56) References Cited

U.S. PATENT DOCUMENTS

| 7,353,268 | B2 * | 4/2008 | Miyahira | 709/224 |
| 7,797,441 | B1 | 9/2010 | Barnes et al. | |
| 2008/0172422 | A1 * | 7/2008 | Li et al. | 707/202 |
| 2009/0017805 | A1 * | 1/2009 | Sarukkai et al. | 455/414.3 |

* cited by examiner

Primary Examiner — Cam Y Truong
Assistant Examiner — Cecile Vo

(57) ABSTRACT

Computer implemented methods and systems are provided for dynamic transcoding to stitch streaming digital content. A selection of a content file is received from a mobile device. An advertisement content file is identified for the selected content file. Attributes of the selected content file are determined. Attributes of the advertisement content file are determined. The advertisement content file and the selected content file are converted so that the attributes of the advertisement content file and the attributes of the selected content file match. The selected content file is stitched with the advertisement content file to produce streaming digital content. The streaming digital content is provided to the mobile device.

17 Claims, 3 Drawing Sheets

DYNAMIC TRANSCODING TO STITCH STREAMING DIGITAL CONTENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wide variety of devices may access computer networks and download information, such as web pages, audio files, and video files. Generally, these devices include computers and handheld devices, such as mobile phones and wireless e-mail devices, which may receive a streaming digital content, such as video and/or digital files. Often, an advertisement is included with the selected digital content to generate revenue for the providers of the selected content and/or for the network service providers. As such, delivering the advertisements or other unselected content and the user selected content without noticeable differences between the delivery of the advertisements and the content may enhance user satisfaction.

SUMMARY

Disclosed herein are computer implemented methods and systems for dynamic transcoding to stitch streaming digital content. A selection of a content file is received from a mobile device. An advertisement content file is identified for the selected content file. Attributes of the selected content file are determined. Attributes of the advertisement content file are determined. At least one of the advertisement content file and the selected content file are converted so that the attributes of the advertisement content file and the attributes of the selected content file match. The selected content file is stitched with the advertisement content file to produce streaming digital content. The streaming digital content is provided to the mobile device.

Some system embodiments include a first server, a transcoder, and a content manager. The first server receives a selection of a content file from a mobile device. The first server also communicates the selection to a second server to obtain an ordered list of location identifiers wherein each location identifier corresponds to an advertising content file. Additionally, the first server identifies an advertisement content file for the selected content file using the ordered list of location identifiers. Moreover, the first server determines attributes of the selected content file and the advertisement content file. The transcoder converts at least one of the advertisement content file and the selected content file so that the attributes of the advertisement content file and the attributes of the selected content file match. The content manager stitches the selected content file with the advertisement content file to produce streaming digital content. The first server then provides the streaming digital content to the mobile device.

In other method embodiments, a selection of a content file is received from a mobile device. An advertisement content file is identified for the selected content file. Requirements of the mobile device are determined. Attributes of the selected content file are determined. The attributes of the selected content file are converted to match the requirements of the mobile device. Attributes of the advertisement content file are determined. The advertisement content file is converted to match the attributes of the mobile device. The content file is stitched with the advertisement content file to produce streaming digital content. The streaming digital content is provided to the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
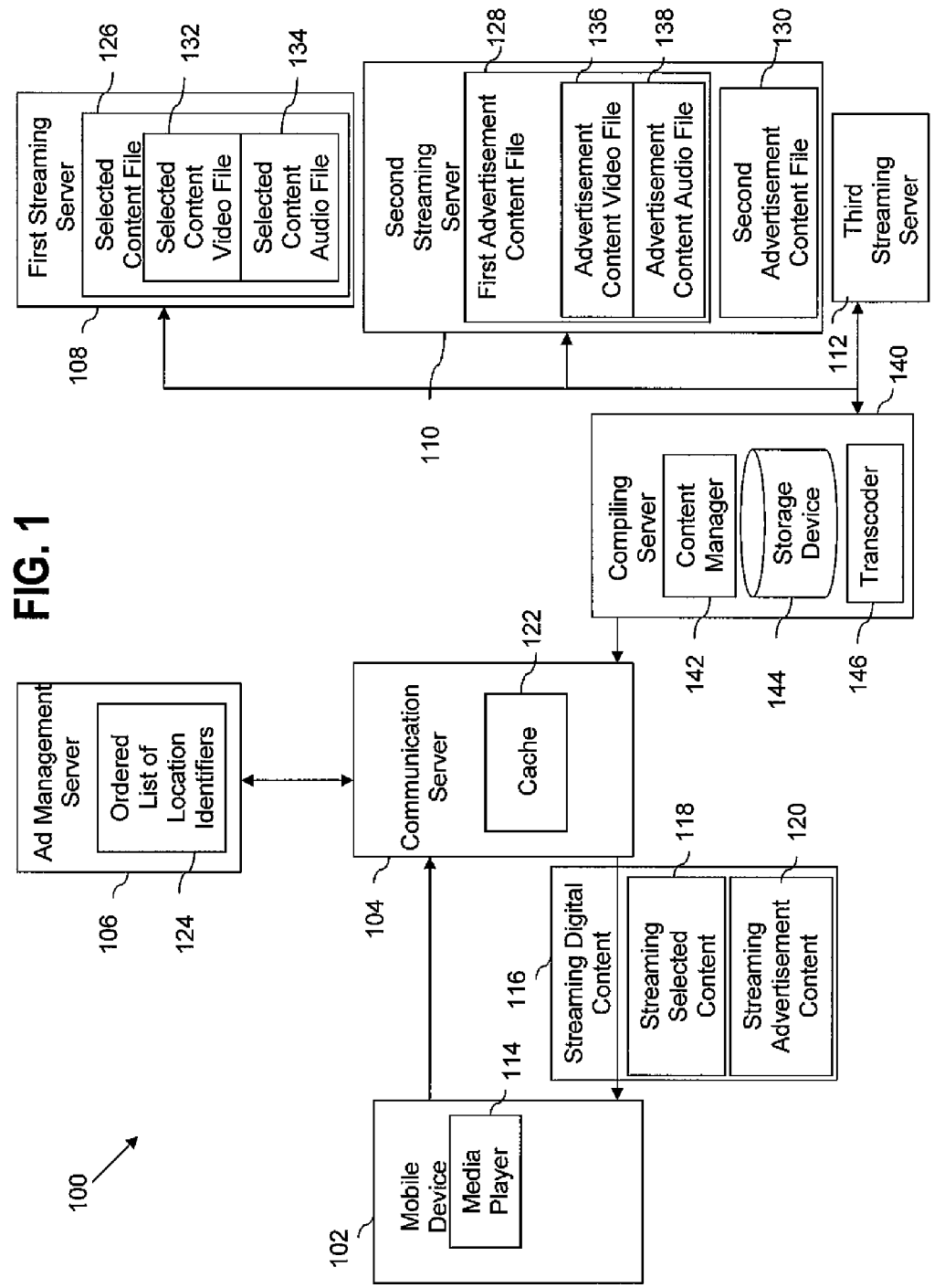
FIG. 1 is an illustration of a wireless communications system for dynamic transcoding to stitch streaming digital content according to some embodiments of the present disclosure.

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A mobile device user has the option of requesting streaming digital content from a wide variety of sources, which may store the streaming digital content in a wide variety of formats. Either the mobile device service provider or the advertisers that sponsor the content may have the option of choosing from numerous streaming digital advertisements to be provided with the streaming digital content to the mobile device. The streaming digital advertisements may be chosen based on the requested content. However, the numerous streaming digital advertisements may be stored in different formats from the storage format for the requested streaming digital content. If a chosen streaming digital advertisement is in a different format from the requested streaming digital content, delivering the advertisements in one format with requested content in another format may result in noticeable differences between the delivery of the content and the delivery of the advertisements. Differences in the video formats and the audio formats may produce an uneven viewing and/or listening experience for the user, which may decrease user satisfaction, particularly when the differences between the formats is significant. Decreased user satisfaction may result in decreased satisfaction for the advertiser or the mobile device service provider.

Disclosed herein are computer implemented methods and systems for dynamic transcoding to stitch together or to join streaming digital content. The present disclosure provides systems and methods that concatenate or "stitch" content files together such that concatenated or stitched content files appear to any mobile device as a single content file. A communication server receives a request for a content file from a mobile device, such as a request to receive a streaming news report. The communication server may choose an advertisement content file for the requested content file based on the requested content and/or mobile device user information. When the communication server obtains the requested content file and the chosen advertisement content file, the communication server determines the attributes of the requested content file and the chosen advertisement content file. The attributes for each content file may include a video codec, a video size, an audio codec, a video frame rate, and an audio sample rate. A transcoder converts the chosen advertisement content file and the requested content file so that the attributes of the chosen advertisement content file and the attributes of the selected content file match. The communication server may also determine requirements and/or limitations of the mobile device, and if necessary, the transcoder may also convert the requested content file and the chosen advertisement content file to match the requirements and/or limitations of the mobile device. A content manager stitches the requested content file with the advertisement content file by concatenating these content files with the same attributes to produce streaming digital content with one set of attributes. The communication server provides the streaming digital content to the mobile device, which may be displayed seamlessly to the mobile device user, thereby enhancing the user experience, which may increase user satisfaction.

Due to the transcoder converting the advertisements, requirements and costs may be reduced or eliminated for storing the streaming advertising content in numerous formats in anticipation of matching the streaming advertising content to requested content of differing formats. The communication server seamlessly presents the advertising content with the requested content so that the user is unaware of the multiple server interaction, thereby increasing flexibility for the mobile device service provider by allowing interaction with many advertisement servers on the market. Furthermore, the communication server and the transcoder may provide easy integration and use of existing protocols/methods for integration, particularly for streaming servers not supporting for example, server-side play lists. Moreover, mobile devices that have power and hardware limitations do not need to provide client-side concatenation or content stitching, i.e., client-side playlist support.

FIG. 1 is an illustration of a wireless communications system 100 for dynamic transcoding to stitch streaming digital content according to some embodiments of the present disclosure. The system 100 includes a mobile device 102, a communication server 104, an ad management server 106, and streaming servers 108-112. The mobile device 102 may be a mobile phone, a mobile telecommunication device, a mobile handset, a personal digital assistant, a handheld gaming device, a handheld wireless mobile device, a pager, a digital camera, a digital music player, a media player, a digital calculator, a mobile computer, a portable computer, a tablet computer, or a laptop computer. Generally, the mobile device 102 has a media player 114, such as audio speakers and/or a video display screen for delivering content to a user. The mobile device 102 may communicate with the communication server 104 by any suitable communication link, such as modem, ethernet, asynchronous transfer mode (ATM), digital subscriber line (DSL), wireless, transmission control protocol/internet protocol (TCP/IP), and/or telephony. One desirable protocol is an Internet Telephony Service Provider (ITSP) protocol. The mobile device 102 may receive streaming digital content 116 using real-time streaming protocol (RTSP) and real-time transport protocol (RTP). The streaming content 116 may include a digital content stream, such as a streaming selected content 118 and a streaming unselected content or streaming advertisement content 120.

The communication server 104 may communicate with the mobile device 102, the ad management server 106, and the streaming servers 108-112. The communication server 104 may have some attributes of a proxy server because the communication server 104 may serve as a gateway through which the mobile device 102 gains access to the streaming digital content 116. The communication server 104 may also include a cache 122 for storing the streaming digital content 116 and its digital content streams 118-120 that are provided to the mobile device 102. Additionally, the communication server 104 may include one or more components for stitching digital streaming packets from the streaming servers 108-112, as hereinafter described.

The communication server 104 may modify stream or content header fields received from the streaming servers 108-112, such as clip sequence and RTP play time, to stream content in a unified fashion to the mobile device 102. The communication server 104 may also receive real time streaming protocol (RTSP) reporting packets (in an embodiment, the RTSP reporting packets may be referred to as or encapsulate real-time transport control protocol (RTCP) packets) from the mobile device 102 and the streaming servers 108-112, combine or segregate header information as necessary, remove RTCP packets if required, and forward the resulting RTCP packets to the proper destination.

The ad management server 106 (also termed the "advertising management server") may receive a selection from the communication server 104 and may also receive consumer information such as a user identification, mobile device location, and content information, such as the identification of the page that provides the link for the streaming selected content 118. In response, the ad management server 106 may determine the link(s) for providing the streaming advertising content 120, which may include one or more advertising content streams or clips. The streaming advertising content 120 may be associated with either the streaming selected content 118 or a user identifier. The ad management server 106 may include an ordered list of location identifiers 124, e.g., URLs which the ad management server 106 may transmit to the communication server 104.

The ordered list of location identifiers 124 is a file containing a list of references to any of the advertisement content files 128 and 130 that promote displaying the streaming digital content 116 via the mobile device 102. Although FIG. 1 depicts only one selected content file 126 and two advertisement content files 128 and 130, the system 100 may include any number of selected content files 126 and advertisement content files 128 and 130. Location identifiers, such as URLs, may provide the location of a file that resides on at least one of the streaming servers 108-112 having access to the Internet, such as a selected content video file 132, a selected content audio file 134, an advertisement content video file 136, and an advertisement content audio file 138. Although FIG. 1 depicts only two video files 132 and 136 and two audio files 134 and 138, the system 100 may include any number of video files 132 and 136 and audio files 134 and 138. The ordered list of location identifiers 124 specifies at least one of the advertisement content files 128-130, such as the first advertisement content file 128. The ad management server 106 may provide, in order, the URLs that include the location on the streaming servers 108-112 of the advertisement content files 128-130 that will become the streaming advertisement content 120 of the streaming digital content 116.

The advertisement content files 128-130 may be targeted or non-targeted advertisements. To provide for targeted advertising, the communication server 104 may augment a request to the ad management server 106 with a user identification taken from the frame headers in the communications from the mobile device 102. The ad management server 106 may use this user information to access databases having information, such as demographic and behavioral information, associated with the user of the mobile device 102. The ad management server 106 may select one of the advertisement content files 128-130 corresponding to the characteristics of the user. Alternatively, the advertisement content files 128-130 may be chosen based on the selected content file 126 selected by the user. If non-targeted advertisements are selected by the ad management server 106, the advertisement content files 128-130 may be, e.g., pre-selected and rotated on a schedule. As one example, the ad management server 106 may receive a request that identifies the selected content as a weather forecast for the city of Houston with a user identifier that enables either the communication server 104 or the ad management server 106 to determine that the requester is a golfer. The ad management server 106 may then provide a play list that includes an advertisement for a golf club, the requested weather forecast for the city of Houston, and an advertisement for a Houston golf course. On the next occasion when the ad management server 106 receives a request for Houston's weather forecast with a user identifier that identifies the requester as a golfer, the play list may include an advertisement for golf balls, the requested weather forecast for the city of Houston, and an advertisement for a Houston country club.

Although FIG. 1 depicts only three streaming servers 108-112, the system 100 may include any number of streaming servers 108-112. The streaming servers 108-112, collectively may provide the selected content file 126 and the advertisement content files 128 and 130. Each of the streaming servers 108-112 may contain one or more of the selected content file 126 and the advertisement content files 128 and 130, such as the second streaming server 110 having the first advertisement content file 128 and the second advertisement content file 130, e.g., a first advertising clip or stream and a second advertising clip or stream. In fact, the second streaming server 110 may serve as a central storehouse for all the advertising content to be associated with a wide number of content providers. Such a configuration may eliminate any need to distribute advertising content to the content providers for them to integrate into their systems.

The selected content file 126 and the first advertisement content file 128 may be transmitted utilizing any suitable protocol, such as RTSP and RTP or other. The selected content file 126 may include the selected content video file 132 and the selected video content audio file 134, while the first advertisement content file 128 may include the advertisement content video file 136 and the advertisement content audio file 138.

The system 100 may not include a compiling server 140 when the streaming servers 108-112 communicate with the communication server 104. However, in some embodiments, the system 100 may include the compiling server 140 that provides processing and storage resources for downloading and caching the content streams, and for logically or physically stitching the content streams in accordance with play lists from the ad management server 106, thereby creating a single streaming digital content 116 to be provided to the mobile device 102. The compiling server 140 may be a streaming server and may be separate or incorporated into the communication server 104.

The compiling server 140 may include a content manager 142, a storage device 144, and a transcoder 146. The content manager 142 may stitch the selected content file 126 with the first advertisement content file 128 to produce the streaming selected content 118 and the streaming advertisement content 120 of the streaming digital content 116. The storage device 144 may store the selected content file 126 with the advertisement content files 128 and 130 that are received from the streaming servers 108-112, as well as the streaming selected content 118 and the streaming advertisement content 120 that is provided to the mobile device 102. The transcoder 146 converts the advertisement content files 128 and 130 and the selected content file 126 so that the attributes of the advertisement content files 128 and 130 and attributes of the selected content file 126 match. As a result, the entire streaming digital content 116 including the streaming selected content 118 and the streaming advertisement content 120 may be presented seamlessly to the user via the mobile device 102, so as to appear as a single streaming content.

Figure 2:
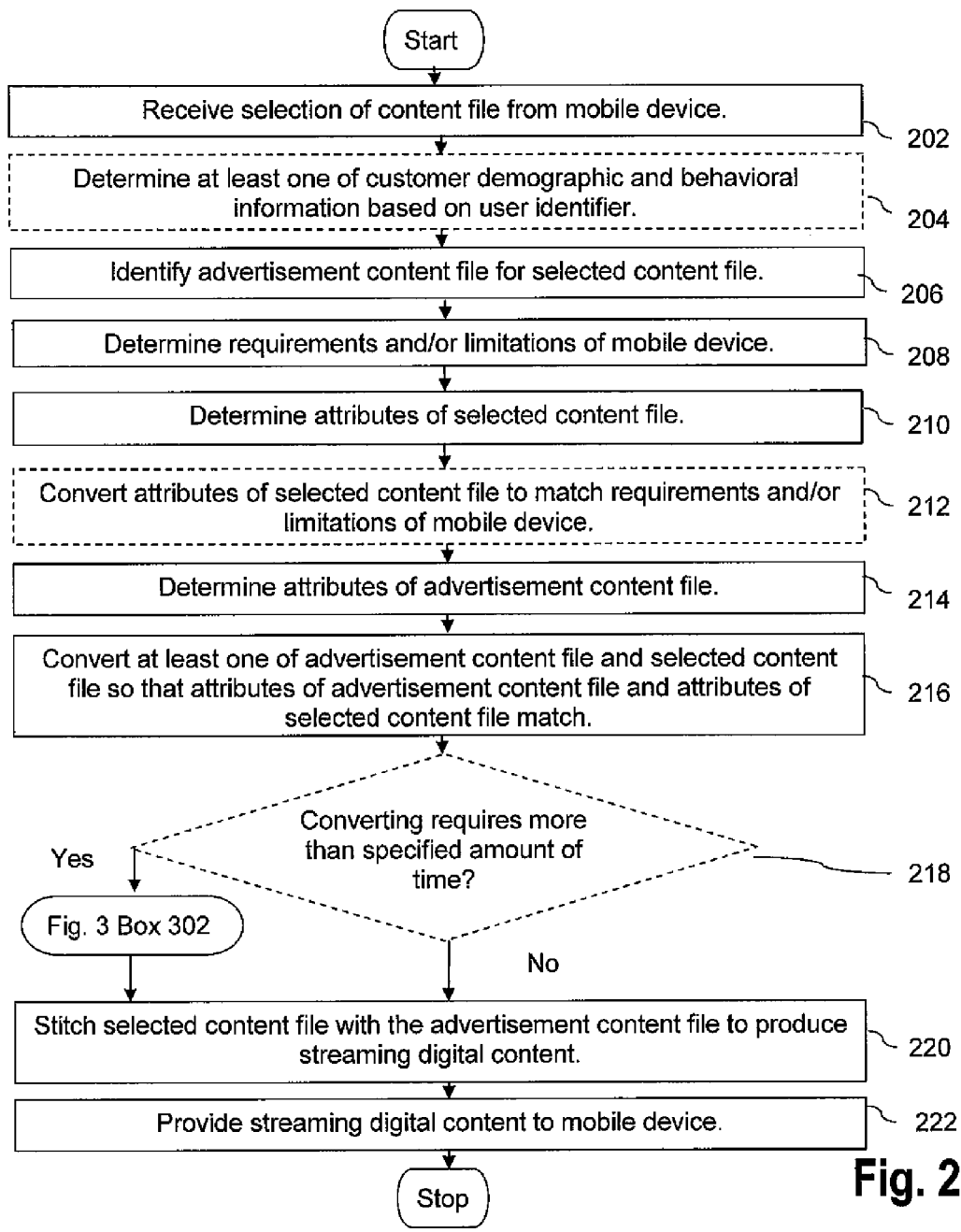
FIG. 2 is a first portion of a flowchart of a method for dynamic transcoding to stitch streaming digital content according to some embodiments of the present disclosure.

FIG. 2 is a first portion of a flowchart of a method for dynamic transcoding to stitch streaming digital content according to some embodiments of the present disclosure. The system 100 may execute the method to receive a request from a mobile device for selected content, identify an advertisement for selected content, convert the advertisement and the selected content to match their attributes, stitch the advertisement to the selected content to produce streaming digital content, and provide the streaming digital content to the mobile device.

In box 202, a selection of a content file is received from a mobile device. For example, the mobile device 102 requests a streaming weather forecast for Houston, and the communication server 104 receives the request from the mobile device 102. The communication server 104 may also receive a user identifier from the mobile device 102 with the request. The communication server 104 may also receive location information from the mobile device 102, which may also form part or all of the basis for identifying an advertisement content file, along with customer demographic and/or behavioral information.

In box 204, a customer demographic and/or behavioral information is optionally determined based on the user identifier. For example, the communication server 104 determines that the user of the mobile device 102 is a golfer based on purchases of golf supplies made via the mobile device 102.

In box 206, an advertisement content file is identified for the selected content file. For example, the communication server 104 identifies the first advertisement content file 128, which is an advertisement for a Houston golf course, for the requested Houston weather forecast based on identifying the user as a golfer. The communication server 104 may communicate the selection to the ad advertisement server 106 to obtain the ordered list of location identifiers 124 wherein each location identifier corresponds to one of the advertising content files 128-130, and wherein each location identifier may include a uniform resource locator. The ad management server 106 may also identify the first advertisement content file 128 for the selected content file 126 based on the customer demographic or the behavioral information. For example, the communication server 104 communicates the selection of the Houston weather forecast and the selection of the first advertisement content file 128 to the ad management server 106 to obtain uniform resource locators for the Houston weather forecast and the Houston golf course advertisement. Continuing this example, the communication server 104 obtains the selected content file 126, which includes the requested Houston weather forecast, and the first advertisement content file 128, which includes the Houston golf course advertisement, from the streaming servers 108-112. One of the streaming servers 108-112, such as the second streaming server 110, may be a server dedicated for advertising content files. The communication server 104 may obtain the first advertisement content files 128 based on a uniform resource locater provided by the ordered list of location identifiers 124 in the ad management server 106. The communication server 104 may also obtain the selected content file 126 or the first advertisement content file 128 from the cache 122 or the storage device 144 if the communication server 104 determines that either of the content files 126-128 were cached in the cache 122 or stored in the storage device 144.

In box 208, requirements and/or limitations of the mobile device are determined. For example, the communication server 104 determines the video display size of the mobile device 102.

In box 210, attributes of the selected content file are determined. For example, the communication server 104 determines attributes of the selected content file 126, including a video codec, a video size, an audio codec, a video frame rate, and/or an audio sample rate. A video codec is a device or software that enables video coding and decoding, and also may enable video compression and/or decompression, for digital video, such as moving picture experts group 1 (MPEG-1), moving picture experts group 2 (MPEG-2), and moving picture experts group 4 (MPEG-4). A video size may indicate a display resolution, which is the number of distinct pixels in each dimension that can be displayed, such as 800 by 600 or 1024 by 768. An audio codec is a device or software that enables audio coding and decoding, and also may enable audio compression and/or decompression, for digital audio, such as X multi media system (XMMS) and MPEG-1 Audio Layer 3 (MP3). A video frame rate is the rate at which video is photographed, such as 24 frames per second, 25 frames per second, and 29.97 frames per second. An audio sample rate is the rate at which audio is recorded, which may match a corresponding video frame rate.

In box 212, the attributes of the selected content file are optionally converted to match the requirements and/or limitations of the mobile device. For example, the transcoder 146 converts the MPEG-2 video codec of the selected content file 126 to match the MPEG-4 video codec of the mobile device 102.

In box 214, attributes of the advertisement content file are determined. For example, the communication server 104 determines the video frame rate of the first advertisement content file 128 is 24 frames per second.

In box 216, at least one of the advertisement content file and the selected content file are converted so that the attributes of the advertisement content file and the attributes of the selected content file match. For example, the transcoder 146 converts the video frame rate of 24 frames per second for the first advertisement content file 128 to match the video frame rate of 25 frames per second of the streaming selected content 118. In another example, the transcoder 146 converts the video frame rate of 25 frames per second of the streaming selected content 118 to match the video frame rate of 24 frames per second for the first advertisement content file 128.

The transcoder 146 may convert the first advertisement content file 128 to match the attributes of the streaming selected content 118 if conversion of the first advertisement content file 128 can be completed in less time, which may occur due to the typically smaller file size for the first advertisement content file 128. The system 100 may identify the first advertisement content file 128 that requires less viewing and/or listening time than the streaming selected content 118 to reduce the possibility of decreasing user satisfaction. If the first advertisement content file 128 requires less viewing and/or listening time then the streaming selected content 118, the first advertisement content file 128 is typically smaller than the streaming selected content 118. In this situation, the transcoder 146 may be able to convert the first advertisement content file 128 in less time than the transcoder 146 may convert the streaming selected content 118. However, if the attributes of the first advertisement content file 128 already match the requirements and/or the limitations of the mobile device 102, and the attributes of the streaming selected content 118 do not match the requirements and/or the limitations of the mobile device 102, the transcoder 146 may convert the streaming selected content 118 to match the attributes of the first advertisement content file 128.

To increase the likelihood that conversion of the advertisement content files 128-130 occurs quickly enough for an advertisement to be played before the requested content is played, the transcoder 146 may select one of the advertisement content files 128-130, such as the second advertisement content file 130, that requires the fewest number of attributes to be converted.

In box 218, whether converting requires more than a specified amount of time is determined. For example, the transcoder 146 determines whether converting the first advertisement content file 128 requires more than 400 milliseconds. If the transcoder 146 determines that converting does not require more than the specified amount of time, the method continues to box 220. If the transcoder 146 determines that converting requires more than the specified amount of time, the method proceeds to box 302 in FIG. 3.

In box 220, the selected content file is stitched with the advertisement content file to produce unified streaming digital content. For example, the content manager 142 stitches the selected content file 126 with the first advertisement content file 128 to produce the streaming selected content 118 and the streaming advertising content 120 of the streaming digital content 116. The content manager 142 may stitch the first advertisement content file 128 before the selected content file 126, such that the media player 114 of the mobile device 102 plays the Houston golf course advertisement before playing the requested Houston weather forecast. The content manager 142 may also stitch the advertisement content file after the selected content stream, such that the media player 114 of the mobile device 102 plays the requested Houston weather forecast before playing the Houston golf course advertisement. Additionally, the content manager 142 may stitch the advertisement content file within the selected content stream, such that the media player 114 of the mobile device 102 plays a portion of the requested Houston weather forecast, plays the Houston golf course advertisement, and then plays the remainder of the requested Houston weather forecast.

Moreover, the content manager 142 may stitch a first advertisement content file before the selected content stream, stitch a second advertisement content file within the selected content stream, and stitch a third advertisement content file after the selected content stream. In this situation, the media player 114 of the mobile device 102 may play Houston golf course advertisement before playing a portion of the requested Houston weather forecast, play an advertisement for a golf club before playing a remainder of the requested Houston weather forecast, and then play an advertisement for a Houston country club. Regardless of the order for the selected content file 126 and any combination of advertisement content files, the content manager stitches these content files together to produce the streaming digital content 116 that appears to the mobile device 102 as a single content file.

The streaming digital content 116 may include streaming selected content 118 associated with the selected content video file 132 and/or the selected content audio file 134, and the streaming advertising content 120 associated with the advertisement content video file 136 and/or the advertisement content audio file 138. For example, the mobile device 102 may play the advertisement for the Houston golf course and the Houston weather forecast using both the video files 132 and 136 and the audio files 134 and 138. The compiling server 140 may cache the first advertisement content file 128 and the streaming digital content 116 in the cache 122. As a result, the communication server 104 may quickly retrieve either the first advertisement content file 128 or the streaming digital content 116 on the next occasion when either is needed. The compiling server 140 may also transmit the streaming digital content 116 to the communication server 104 when the compiling server 140 and the communication server 104 are separate entities.

In box 222, the streaming digital content is provided to the mobile device. For example, the communication server 104 provides the streaming digital content 116 to the mobile device 102, which uses the media player 114 to play the advertisement for the Houston golf course and the Houston weather forecast.

Figure 3:
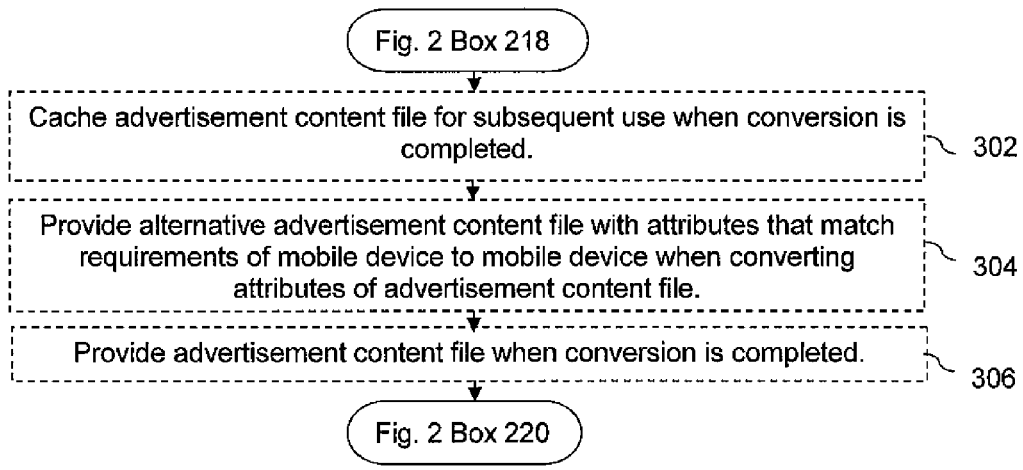
FIG. 3 is a second portion of the flowchart of the method for dynamic transcoding to stitch streaming digital content according to some embodiments of the present disclosure.

FIG. 3 is a second portion of the flowchart of the method for dynamic transcoding to stitch streaming digital content according to some embodiments of the present disclosure. The system 100 executes the second portion of the flowchart when converting requires more than a specified amount of time.

In box 302, the advertisement content file is optionally cached for subsequent use when conversion is completed. For example, the compiling server 140 may cache the first advertisement content file 128 in the cache 122 for subsequent use when conversion is completed. Although conversion of the Houston golf course advertisement may be taking too long for inclusion with the current request for the Houston weather forecast, once converted the Houston golf course advertisement may be quickly retrieved from the cache 122 when other golfers subsequently request the Houston weather forecast.

In box 304, an alternative advertisement content file with attributes that match the requirements of the mobile device is optionally provided to the mobile device when converting the attributes of the selected content file. For example, the communication server 104 provides the second advertisement content file 130, which is an advertisement for golf clubs, for conversion by the transcoder 146 because the second advertisement content file 130 has attributes that match the requirements of the mobile device 102. The transcoder 146 may quickly convert the second advertisement content file 130 because few of the attributes of the second advertisement content file 130 need to be converted to match the requirements of the mobile device 102. The transcoder 146 converts the second advertisement content file 130 to match the requirements of the mobile device 102 when the transcoder has already converted the selected content file 126 to match the requirements of the mobile device 102.

In box 306, the advertisement content file is optionally provided when conversion is completed. For example, the communication server 104 provides the first advertisement content file 128 when conversion is completed, such that the media player 114 plays the advertisement for the Houston golf course after playing the Houston weather forecast, rather than before the Houston weather forecast. In this way, the transcoder 146 may continue the lengthy conversion of the Houston golf course advertisement while the media player 114 begins playing the requested Houston weather forecast. When the Houston golf course advertisement is converted, it is stitched to the end of the Houston weather forecast before the media player 114 plays the end of the Houston weather forecast. In this situation, the communication server 104 may provide an alternative advertisement content file with a greater number of attributes that match the selected content file 126 because the transcoder 146 may convert such an advertisement content file in time for playing before the selected content file 126. Then the method continues to box 220 in FIG. 2.

Figure 4:
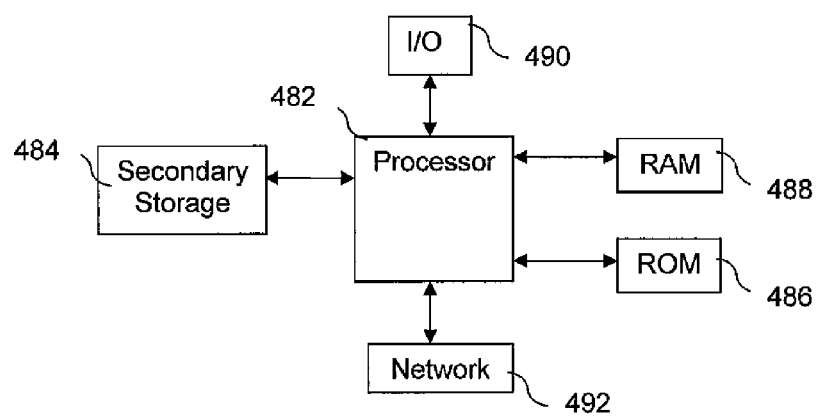
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein

What is claimed is:

1. A computer implemented method for dynamic transcoding to stitch streaming digital content, comprising:
    receiving a selection of a content file from a mobile device;
    identifying an advertisement content file for the selected content file;
    determining attributes of the selected content file;
    determining attributes of the advertisement content file;
    converting at least one of the advertisement content file and the selected content file to produce at least one of a converted selected content file and a converted advertisement content file so that the attributes of one of the advertisement content file and the converted advertisement content file and the attributes of one of the selected content file and the converted selected content file match;
    determining whether converting the advertisement content file requires more than a specified amount of time;
    providing an alternative advertisement content file with attributes that match requirements of the mobile device in response to determining that converting the advertisement content file requires more than the specified amount of time;
    providing the converted advertisement content file when conversion is completed in response to determining that converting the advertisement content file requires less than the specified amount of time;
    stitching one of the selected content file and the converted selected content file with one of the advertisement content file, the alternative advertisement content file, and the converted advertisement content file to produce streaming digital content, wherein the streaming digital content comprises at least one of the converted selected content file, the alternative advertisement content file, and the converted advertisement content file; and
    providing the streaming digital content to the mobile device.

2. The computer implemented method of claim 1, wherein the mobile device is one of a mobile phone, a mobile telecommunication device, a mobile handset, a personal digital assistant, a handheld gaming device, a handheld wireless mobile device, a pager, a digital camera, a digital music player, a media player, a digital calculator, a mobile computer, a portable computer, a tablet computer, and a laptop computer.

3. The computer implemented method of claim 1, further comprising:
    receiving a user identifier from the mobile device; determining at least one of a customer demographic and a behavioral information based on the user identifier; and
    identifying the advertisement content file for the selected content file based on the at least one of the customer demographic and the behavioral information.

4. The computer implemented method of claim 1, wherein the attributes of the selected content file comprise a video codec, a video size, an audio codec, a video frame rate, and an audio sample rate.

5. The computer implemented method of claim 1, wherein stitching one of the selected content file and the converted selected content file with one of the advertisement content file and the converted advertisement content file comprises stitching one of the advertisement content file and the converted advertisement content file before one of the selected content file and the converted selected content file.

6. The computer implemented method of claim 1, wherein stitching one of the selected content file and the converted selected content file with one of the advertisement content file and the converted advertisement content file comprises stitching one of the advertisement content file and the converted advertisement content file after one of the selected content file and the converted selected content file.

7. The computer implemented method of claim 1, wherein stitching one of the selected content file and the converted selected content file with one of the advertisement content file and the converted advertisement content file comprises stitching one of the advertisement content file and the converted advertisement content file within one of the selected content file and the converted selected content file.

8. The computer implemented method of claim 1, wherein the streaming digital content comprises one of streaming selected content and streaming converted selected content, wherein the streaming selected content is associated with at least one of a selected content video file and a selected content audio file and the streaming converted selected content is associated with at least one of a converted selected content video file and a converted selected content audio file, and wherein the streaming digital content further comprises one of streaming advertising content and streaming converted advertising content, wherein the streaming advertising content is associated with at least one of an advertisement content video file and an advertisement content audio file and the streaming converted advertising content is associated with at least one of a converted advertisement content video file and a converted advertisement content audio file.

9. A system for dynamic transcoding to stitch streaming digital content, comprising:

a first server, comprised a processor, configured to receive a selection of a content file from a mobile device, to communicate the selection to a second server to obtain an ordered list of location identifiers, wherein each location identifier corresponds to an advertising content file, to identify an advertisement content file for the selected content file using the ordered list of location identifiers, to determine attributes of the selected content file, and to determine attributes of the advertisement content file;

a transcoder configured to convert at least one of the advertisement content file and the selected content file to produce at least one of a converted selected content file and a converted advertisement content file so that the attributes of one of the advertisement content file and the converted advertisement content file and the attributes of one of the selected content file and the converted selected content file match;

the transcoder further configured to determine whether conversion of the advertisement content file requires more than a specified amount of time, and further configured to cache the converted advertisement content file when conversion is completed in response to determining that converting the advertisement content file requires more than the specified amount of time;

the first server further configured to provide an alternative advertisement content file with attributes that match the attributes of the selected content in response to a determination that conversion of the advertisement content file requires more than the specified amount of time; and a content manager configured to stitch one of the selected content file and the converted selected content file with one of the advertisement content file, the alternative advertisement content file, and the converted advertisement content file to produce streaming digital content, wherein the streaming digital content comprises at least one of the converted selected content file, the alternative advertisement content file, and the converted advertisement content file, and wherein the first server is further configured to provide the streaming digital content to the mobile device.

10. The system of claim 9, wherein the selected content file is obtained from at least one of a local cache, a local storage device, and a plurality of streaming servers.

11. The system of claim 9, wherein the advertisement content file is obtained from at least one of a local cache, a local storage device, and a plurality of streaming servers.

12. The system of claim 11, wherein at least one of the plurality of streaming servers is server dedicated for advertising content files.

13. The system of claim 9, further comprising a compiling server to cache at least one of the advertisement content file and the streaming digital content, and to transmit the streaming digital content to the first server.

14. The system of claim 9, wherein each location identifier comprises a uniform resource locator.

15. A computer implemented method for dynamic transcoding to stitch streaming digital content, comprising:

receiving a selection of a content file from a mobile device;

identifying an advertisement content file for the selected content file;

determining at least one of requirements and limitations of the mobile device;

determining attributes of the selected content file;

converting the selected content file to a converted selected content file, wherein attributes of the converted selected content file match the requirements and limitations of the mobile device;

determining attributes of the advertisement content file;

converting the advertisement content file to a converted advertisement content file, wherein attributes of the converted advertisement content file match the at least one of requirements and limitations of the mobile device;

determining whether converting the advertisement content file requires more than a specified amount of time;

providing an alternative advertisement content file with attributes that match the requirements of the mobile device to the mobile device when converting the attributes of the advertisement content file in response to determining that converting the advertisement content file requires more than the specified amount of time;

providing the converted advertisement content file when conversion is completed in response to determining that converting the advertisement content file does not require more than the specified amount of time;

stitching the converted selected content file with one of the converted advertisement content file and the alternative advertisement content file to produce streaming digital content; and providing the streaming digital content to the mobile device.

16. The computer implemented method of claim 15, further comprising:

caching the advertisement content file for subsequent use when conversion is completed in response to determining that converting the advertisement content file requires more than the specified amount of time.

17. The computer implemented method of claim 15, wherein converting the advertisement content file to a converted advertisement content file comprises selecting a copy of the advertisement content file that requires a least amount of conversion.

* * * * *